US010625687B1

(12) United States Patent
Todd et al.

(10) Patent No.: US 10,625,687 B1
(45) Date of Patent: Apr. 21, 2020

(54) COLLAPSIBLE TRUCK TRUNK

(71) Applicant: SPI Blow Molding LLC, Coloma, IN (US)

(72) Inventors: James McNeilly Todd, Marshall, MI (US); Ed Yingming Wu, Aurora, IL (US); Nicholas P. Kraus, Cassopolis, MI (US); Edward A. Trapp, Coloma, MI (US)

(73) Assignee: SPI Blow Molding, LLC, Coloma, MI (US)

( * ) Notice: Subject to any disclaimer, the term of this patent is extended or adjusted under 35 U.S.C. 154(b) by 0 days.

(21) Appl. No.: 16/245,586

(22) Filed: Jan. 11, 2019

(51) Int. Cl.
*B62D 33/00* (2006.01)
*B60R 9/06* (2006.01)
*B62D 33/023* (2006.01)

(52) U.S. Cl.
CPC .......... *B60R 9/065* (2013.01); *B62D 33/023* (2013.01)

(58) Field of Classification Search
CPC ......... B60R 9/065; B60R 5/045; B60R 11/06; B60R 5/04; B60J 7/141; B62D 33/023; B65D 7/24; B65D 7/26; B65D 7/28; B65D 7/30; B65D 7/32
USPC ...................................................... 224/404
See application file for complete search history.

(56) References Cited

U.S. PATENT DOCUMENTS

| | | | | |
|---|---|---|---|---|
| 1,194,570 A * | 8/1916 | Stuart | ............... | B65D 7/26 |
| | | | | 220/6 |
| 1,972,483 A * | 9/1934 | Hartson | ............... | B65D 7/26 |
| | | | | 220/6 |
| 5,464,264 A * | 11/1995 | Wilson | ............... | B60R 9/00 |
| | | | | 224/404 |
| 5,853,116 A * | 12/1998 | Schreiner | ............... | B60R 9/00 |
| | | | | 224/404 |
| 6,170,724 B1 * | 1/2001 | Carter | ............... | B60R 9/00 |
| | | | | 220/4.29 |
| 6,676,182 B2 * | 1/2004 | Fitts | ............... | B60P 3/40 |
| | | | | 224/403 |
| 6,824,184 B2 * | 11/2004 | Leitner | ............... | B60R 9/00 |
| | | | | 224/404 |
| 7,234,618 B2 * | 6/2007 | Warganich | ............... | B60R 7/02 |
| | | | | 224/403 |
| 2002/0179600 A1 * | 12/2002 | King | ............... | B60R 9/00 |
| | | | | 220/6 |
| 2010/0264180 A1 * | 10/2010 | Allotey | ............... | B60R 9/00 |
| | | | | 224/404 |

(Continued)

*Primary Examiner* — Nathan J Newhouse
*Assistant Examiner* — Matthew T Theis
(74) *Attorney, Agent, or Firm* — Botkin & Hall, LLP

(57) ABSTRACT

A folding truck box is designed to fit in the bed of a truck adjacent a tailgate. The truck box has a top and vertical sidewalls. The sidewalls have a height defined by a first distance between a bottom edge that rests on the bed floor and a top edge. The top overlays the sidewalls and has a second distance between a bedrail contacting surface and the surface that contacts the sidewalls. The first and second distances are greater than the distance between the bed floor and the underside of the bedrails. The top fits between the truck bedrails and the sidewalls with biased upward force on the bedrails. The truck box contains resilient retainer straps that are closed between the truck bed floor and tailgate. A locking leg in the top extends into a locking aperture in one of the sidewalls to prevent the top from being removed.

20 Claims, 19 Drawing Sheets

(56) References Cited

U.S. PATENT DOCUMENTS

2012/0181810 A1\* 7/2012 Alvarino ................ B60R 13/01
296/39.2

\* cited by examiner

COLLAPSIBLE TRUCK TRUNK

BACKGROUND OF THE INVENTION

This present disclosure relates to storage containers for use with pickup truck beds. A pickup truck is a very useful vehicle, designed to tow trailers, haul cargo, and perform a myriad of other tasks where a passenger car is not capable. A truck, due to its bed, has limited in-cab storage and is limited to storage behind or underneath a seat. Some truck owners have to resort to a bed-mounted toolbox to store items, but a bed-mounted toolbox is designed to be mounted and left in place, effectively removing valuable bed space. These are affixed to the bed adjacent the cab, where access is only from the sides of the bed. Other users use portable plastic storage totes, but these slide around and are not secure. Other storage containers will attach to the bed via brackets and bolts, but these require drilling, bolting, or otherwise permanently modifying the bed, lowering resale value. If the user is leasing the truck, modification can result in penalties at the leasing company when the truck is turned back in. An improved storage container is needed.

SUMMARY OF THE INVENTION

The present disclosure describes a collapsible portable folding storage system that utilizes the tailgate as one wall to secure the contents therein. The storage system is sized to fit in the tailgate end of a truck bed and be secured by the bed rails and tailgate. The storage system has sidewalls that are hinged and are sized to rest on the bed floor. The storage system includes a top wall that is hinged in the middle. As installed in the truck bed, the sidewalls form three sides of the enclosure, with the tailgate forming a fourth side. The top wall overlays the sidewalls and is wedged under the bed rails with the sidewalls supporting it. The top wall includes a support leg that pivots down and functions as a lock. The rear sidewall has a locking aperture that receives a portion of the support leg. When the locking aperture has received the support leg, the top wall is captured to the rear sidewall. The storage system includes a strap that is closed between the tailgate and the bed to prevent any movement of the system. The top wall overhangs the rear sidewall to secure the position of the rear sidewall. Optional adjusters accommodate for different heights between the truck bed floor and rails, such as those caused by model changes, bed mats, bed liners, and other differences.

BRIEF DESCRIPTION OF THE DRAWINGS

A preferred embodiment of this invention has been chosen wherein.

DESCRIPTION OF THE PREFERRED EMBODIMENT

Figure 1:
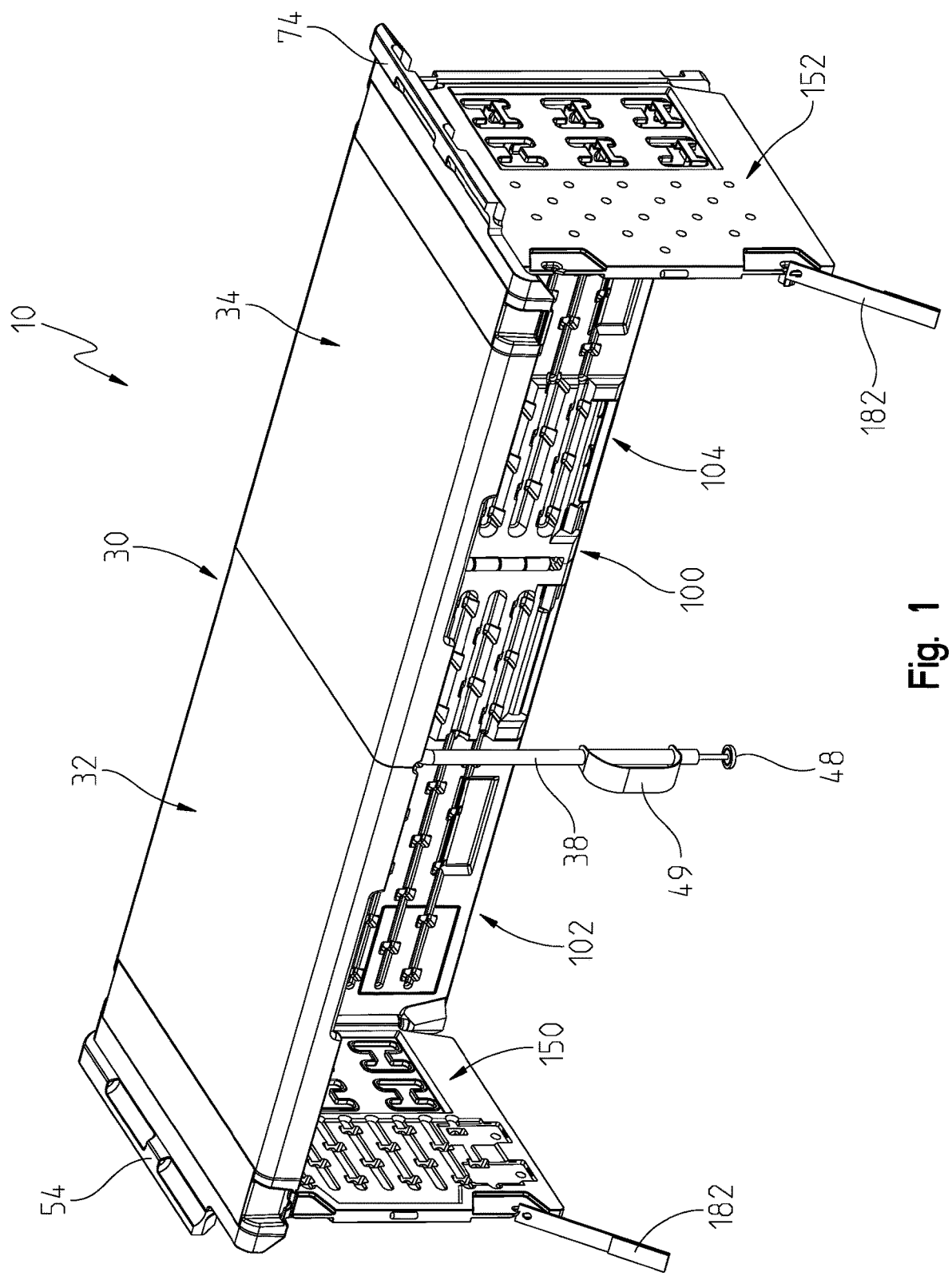
FIG. 1 is a top isometric view of the trunk in the unfolded and use position.
Figure 2:
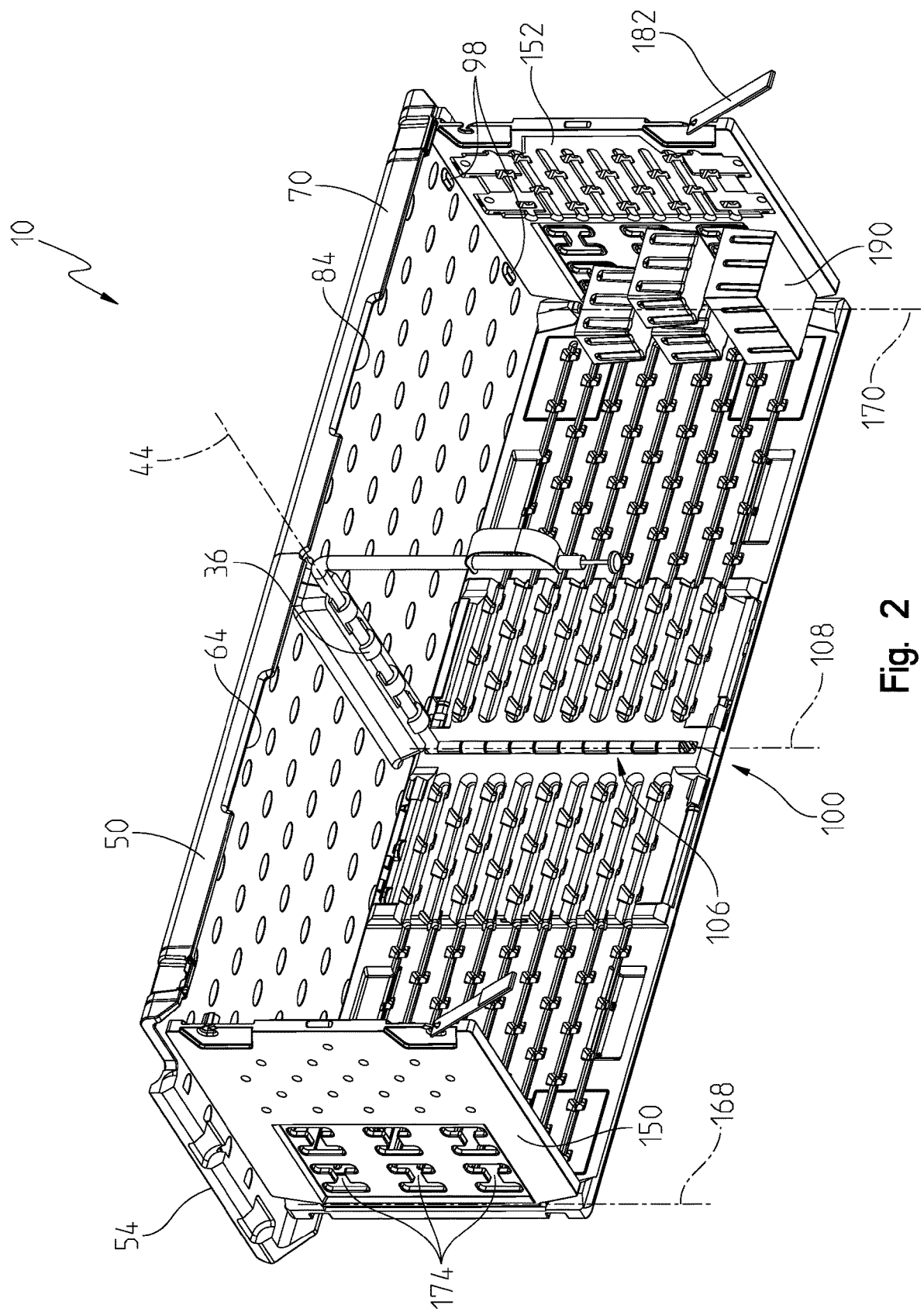
FIG. 2 is a bottom isometric view of the trunk in FIG. 1.
Figure 3:
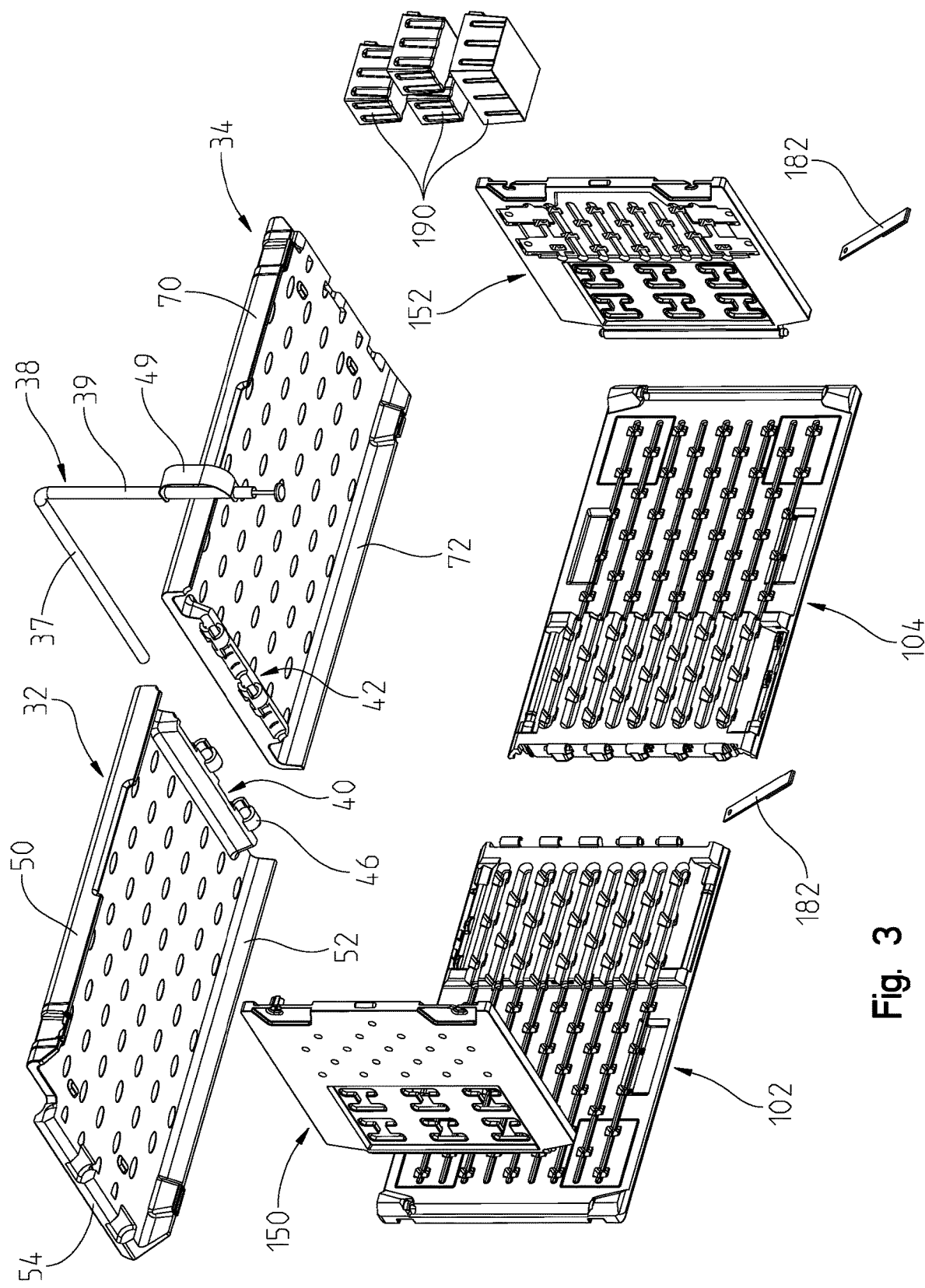
FIG. 3 is an exploded isometric view of the trunk in FIG. 2.
Figure 4:
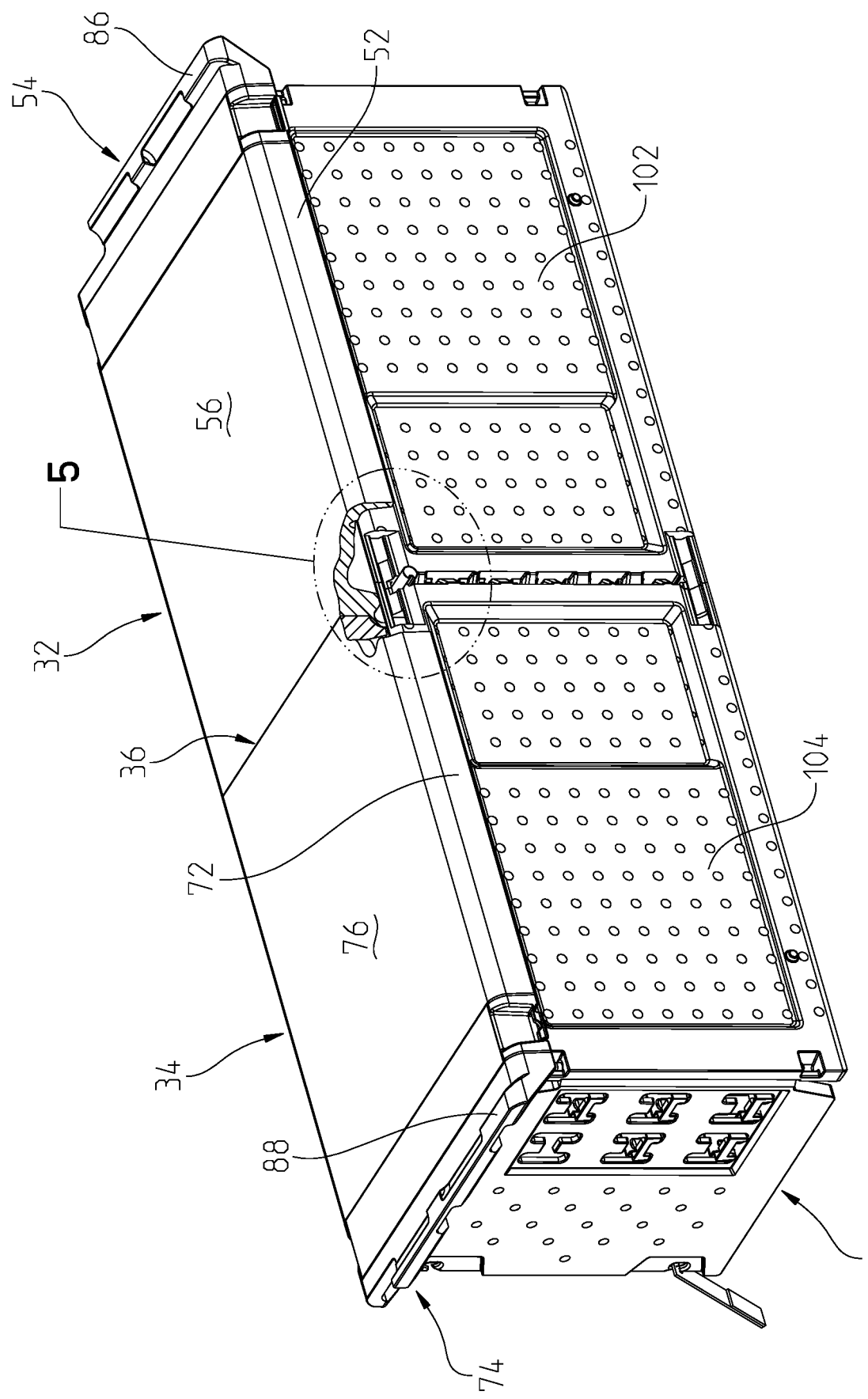
FIG. 4 is a rear isometric view of the trunk in FIG. 1.

A truck storage trunk 10 is shown in FIGS. 1-20 that is designed to be used with a pickup truck bed 12, shown in FIGS. 10-13. The trunk 10 is secured to the bed 12 adjacent the tailgate 14. The truck bed 12 has a floor 16, left side 18, right side 20, and bed rails 22, 24. The tailgate 14 pivots about a tailgate axis 26 between a down and a closed position. For the purposes of clarity, and not defining or implying any limitation whatsoever, the side of the trunk 10 that is closest to the tailgate 14 is hereinafter referred to as the front and the side that is furthest will be referred to as the rear. Any other references to top, bottom, sides, left, right, front, and rear are to describe components and features and not intended to be limiting.

Figure 11:
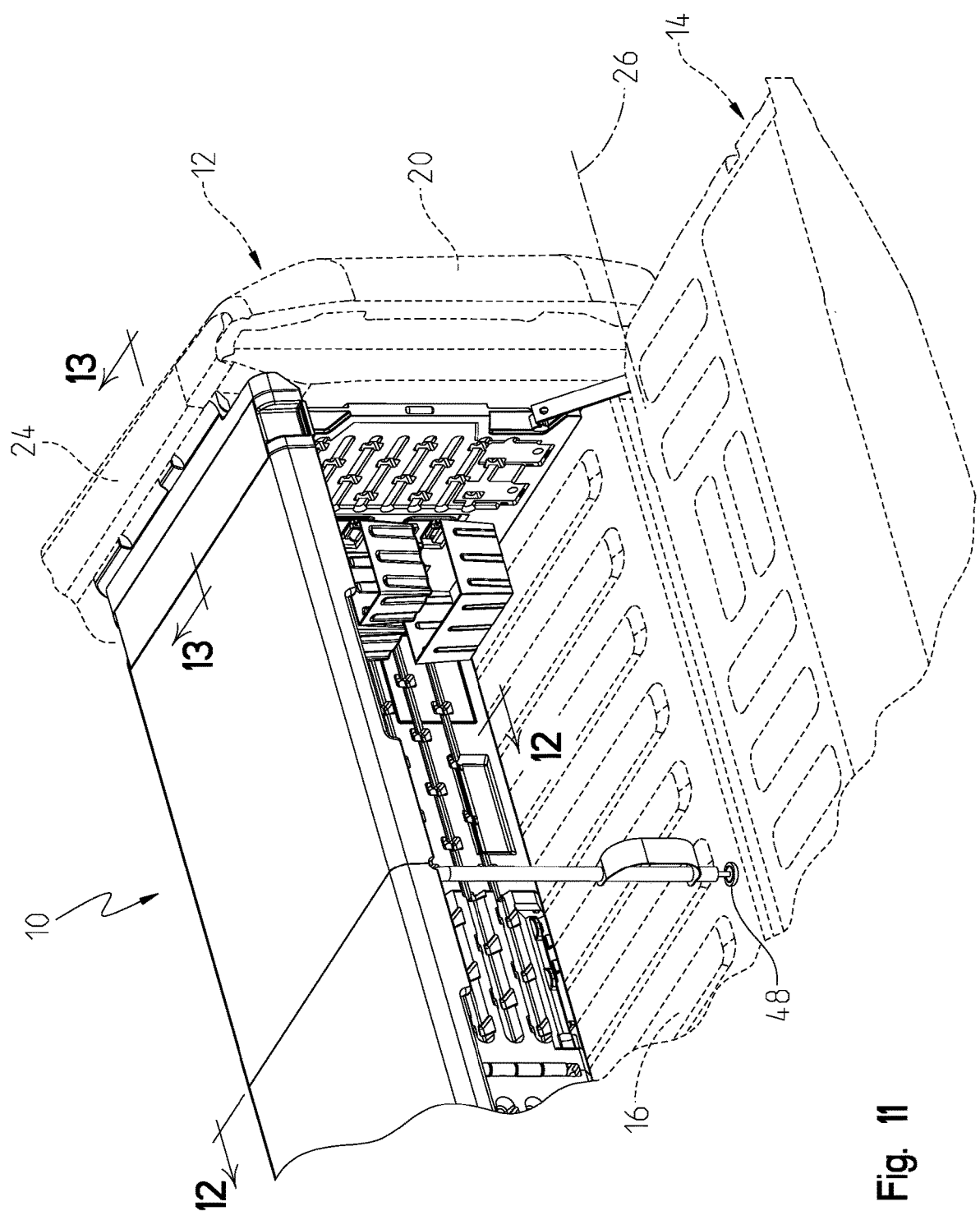
FIG. 11 is a top isometric view of the trunk in FIG. 1 as installed in a truck bed.
Figure 12:
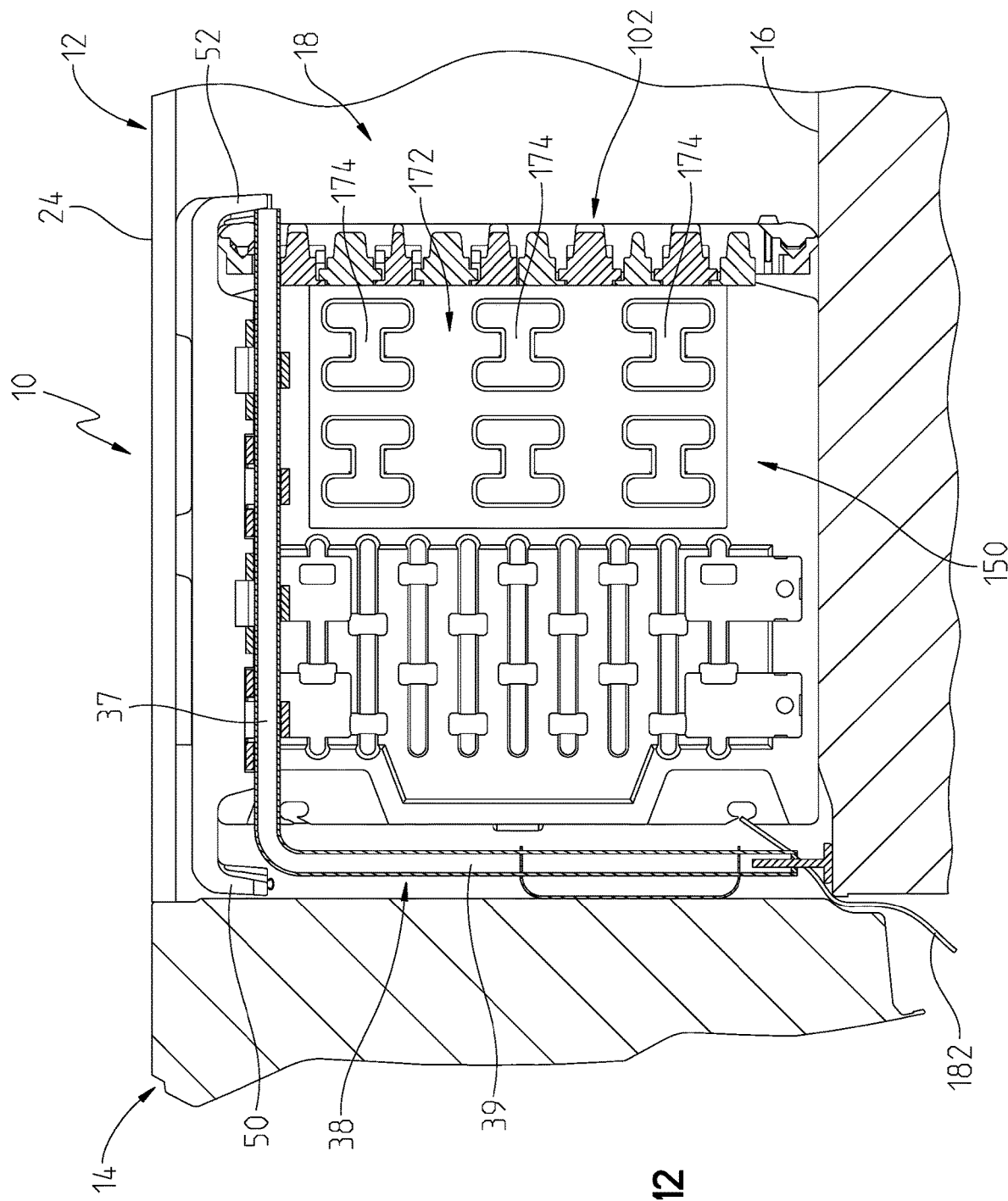
FIG. 12 is a section view 12-12 of the trunk with the top installed in a truck bed as shown in FIG. 11.
Figure 14:
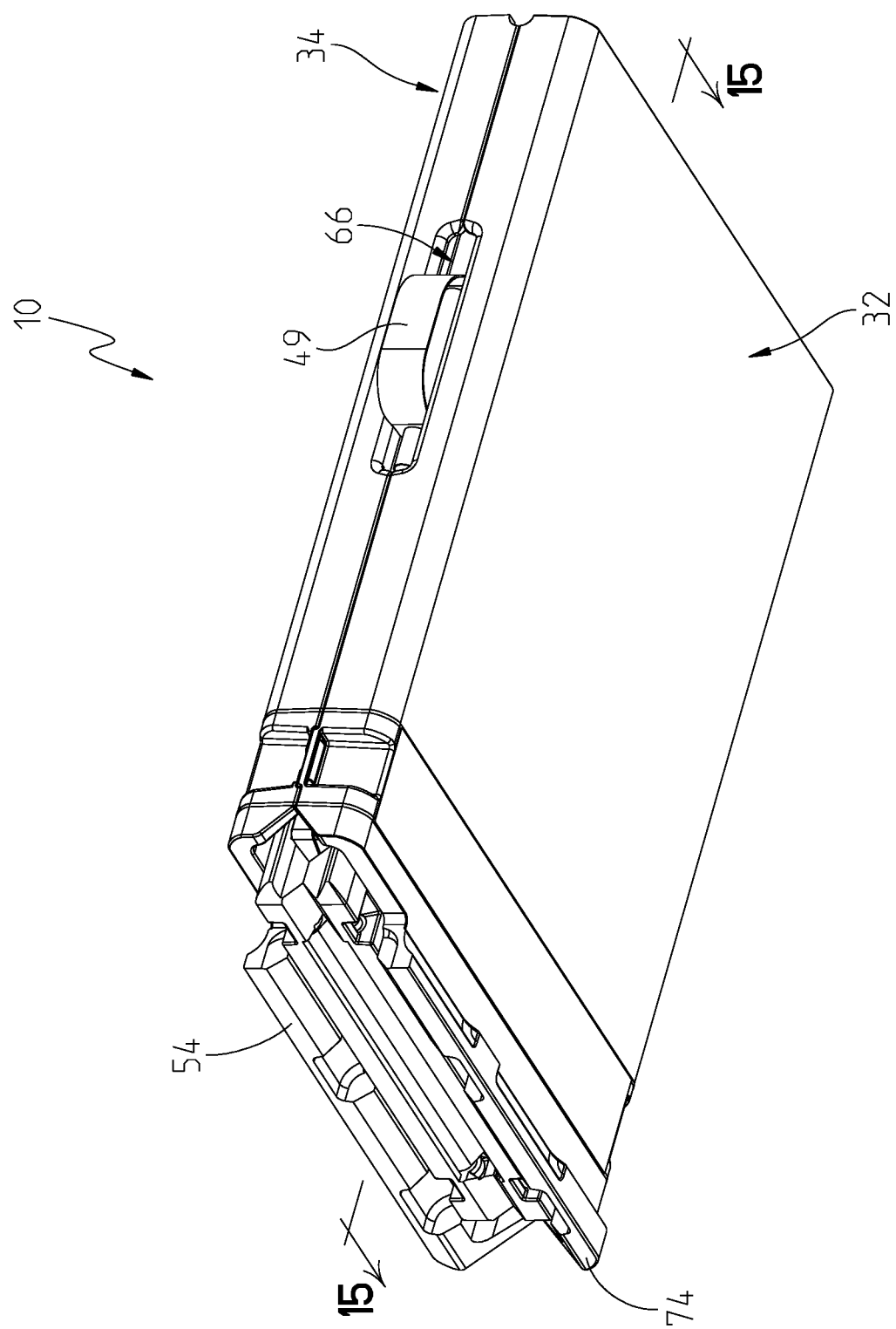
FIG. 14 is an isometric view of the trunk in the folded and stored position.
Figure 15:
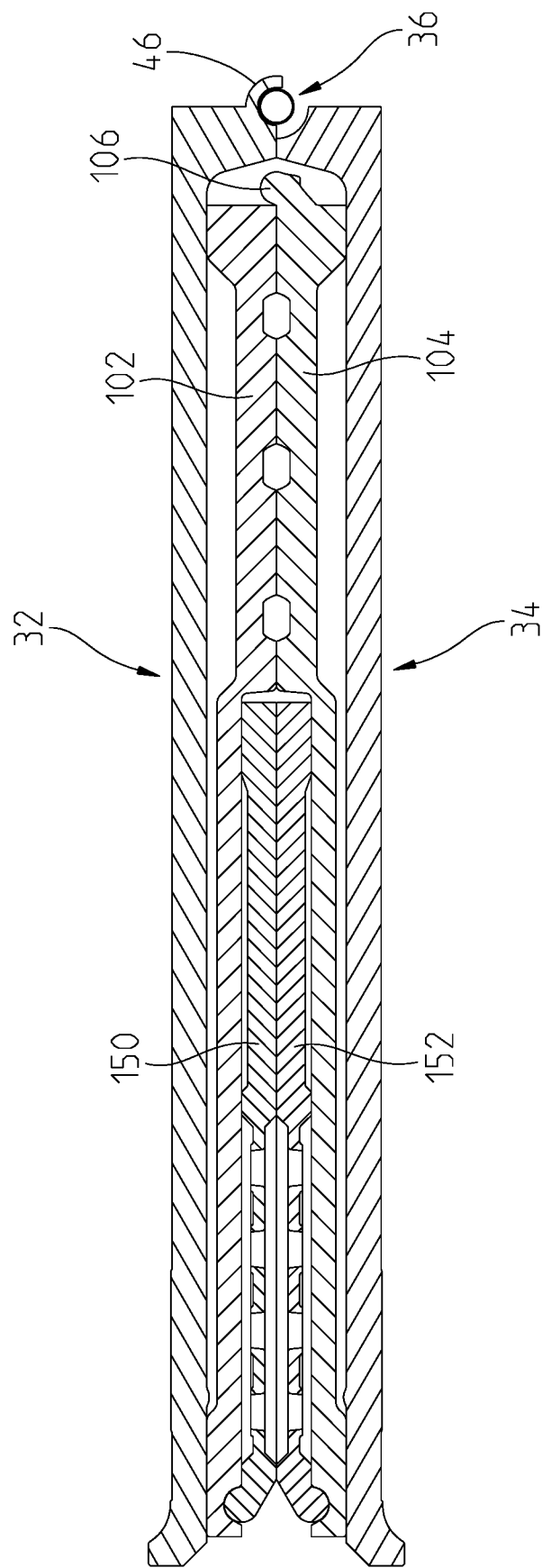
FIG. 15 is a section view 15-15 of the trunk in FIG. 14.
Figure 16:
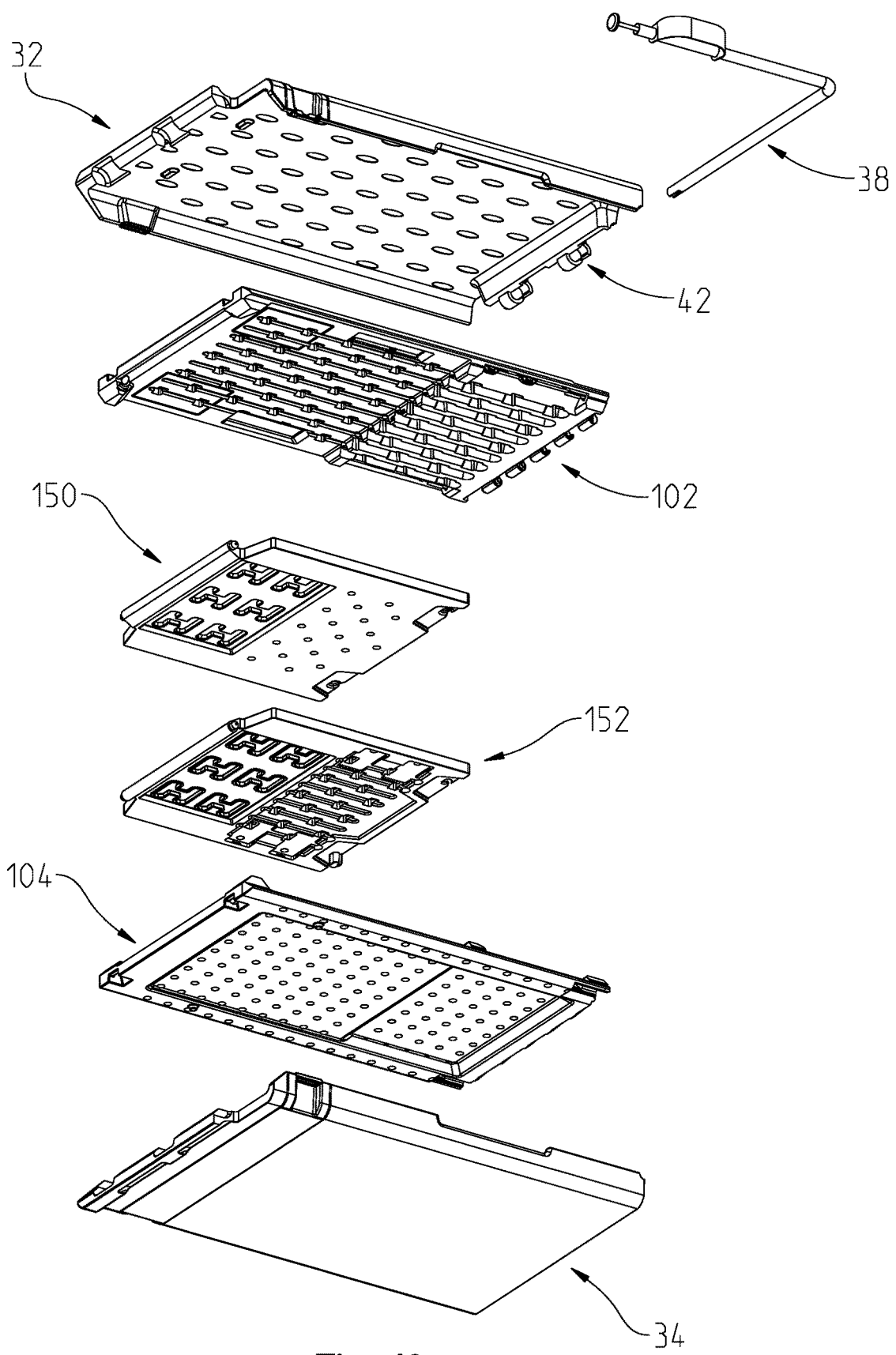
FIG. 16 is an isometric exploded view of the trunk as shown in FIG. 14.

When installed on the truck bed 12, the trunk 10, floor 16, and tailgate 14 provide an enclosed volume that can secure belongings. This is shown in FIGS. 11-12. The trunk 10 can be folded flat for storage as shown in FIGS. 14-15. When installed, the only way to access the enclosed volume of the trunk 10 is by opening the tailgate 14.

The trunk 10 is comprised of several panels that cooperate with each other. The top 30 has a left side 32 and a right side 34 that are connected through a hinge 36. A locking leg 38 has a hinge portion 37 that extends through apertures 40 in the left side 32 and apertures 42 in the right side to form the hinge 36. The locking leg 38 has a support portion 39 that includes an adjustable foot 48 and a carry handle 49. The left side 32 and right side 34 pivot with respect to each other on a hinge axis 44 between a folded position and an unfolded position. The folded position is used to form the outside of the trunk 10 when stored, shown in FIG. 14. As shown, the apertures 40, 42 are formed by "C" shaped arcuate segments 46 that are centered on the hinge axis 44. As assembled, the segments 46 are staggered along the hinge axis 44. The left side 32 shares many features with the right side 34, with the shared features being mirror symmetrical about the hinge axis 44. The left side 32 has a front overhanging portion 50 and a rear overhanging portion 52. A wedge portion 54 is located oppositely the arcuate segments 46. A top wall portion 58 has a bottom surface 57 and top surface 56 with the wedge portion 54 extending beyond the top surface 56. Storage locking tabs 60, 62 are located on corresponding overhanging portions 50, 52. The right side 34 has a front overhanging portion 70 and a rear overhanging portion 72.

Figure 13:
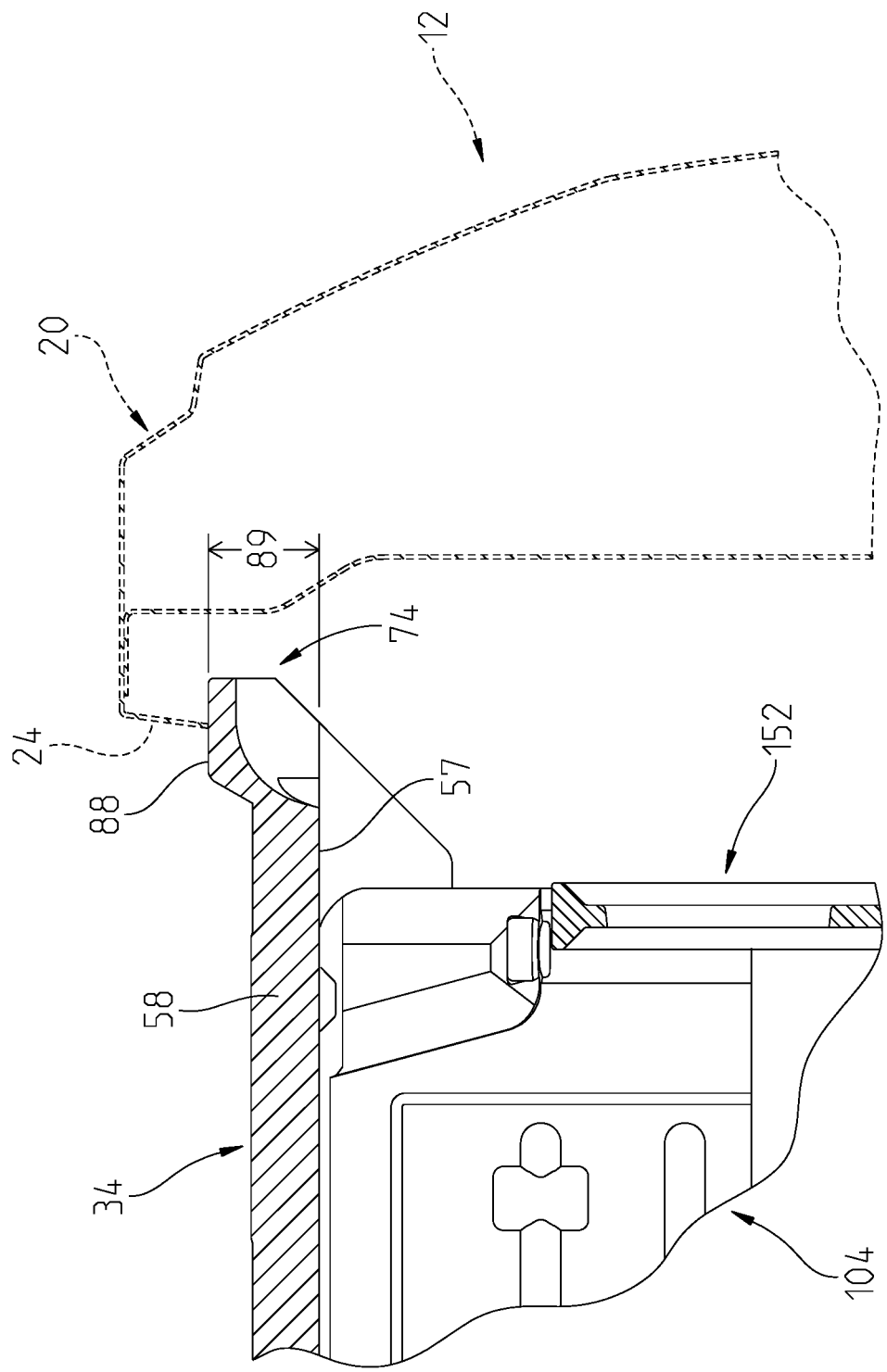
FIG. 13 is a partial section view 13 of the trunk installed as shown in FIG. 11.
Figure 18:
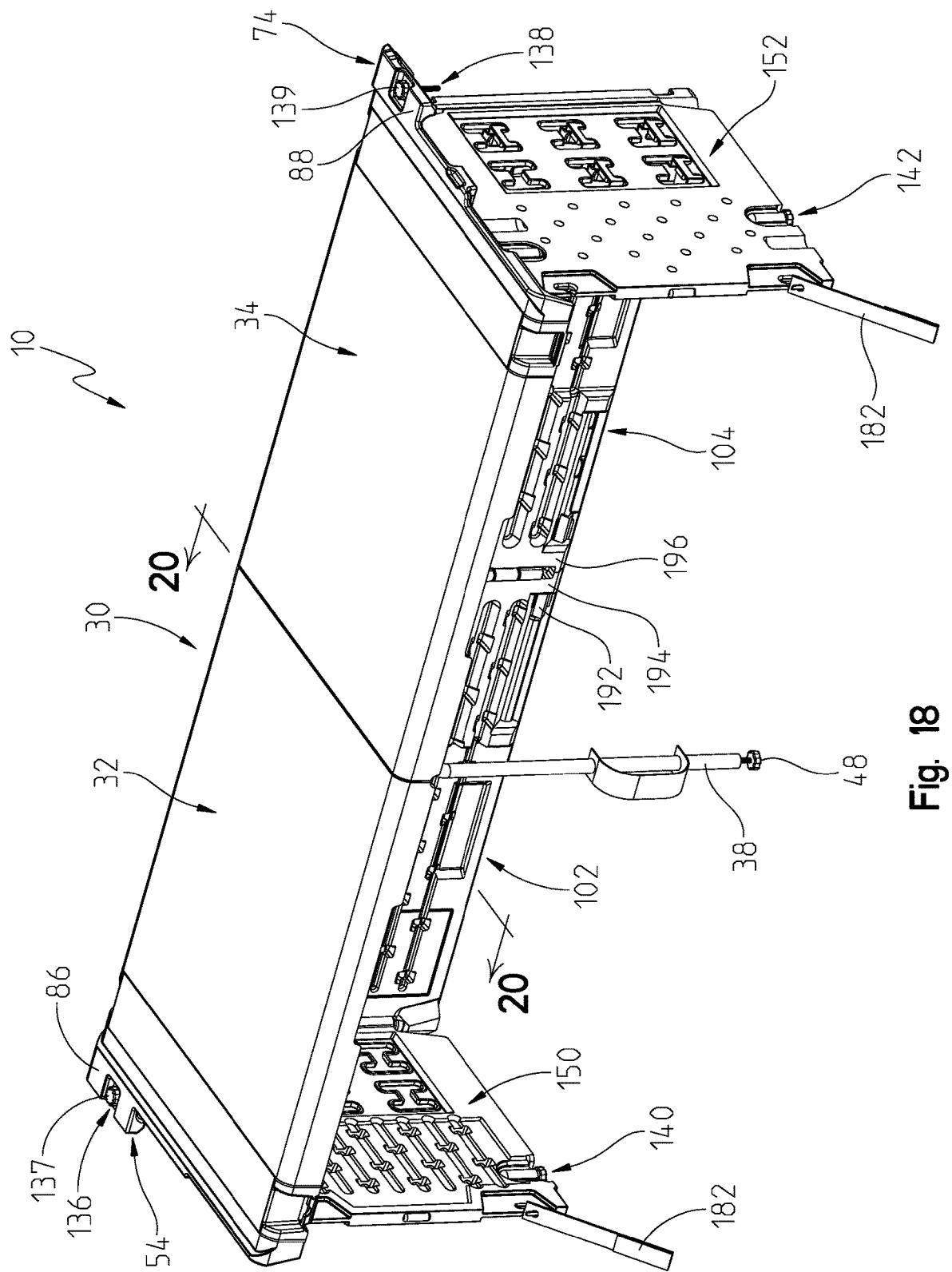
FIG. 18 is a top isometric view of the trunk with adjustable feet in the unfolded and use position.
Figure 19:
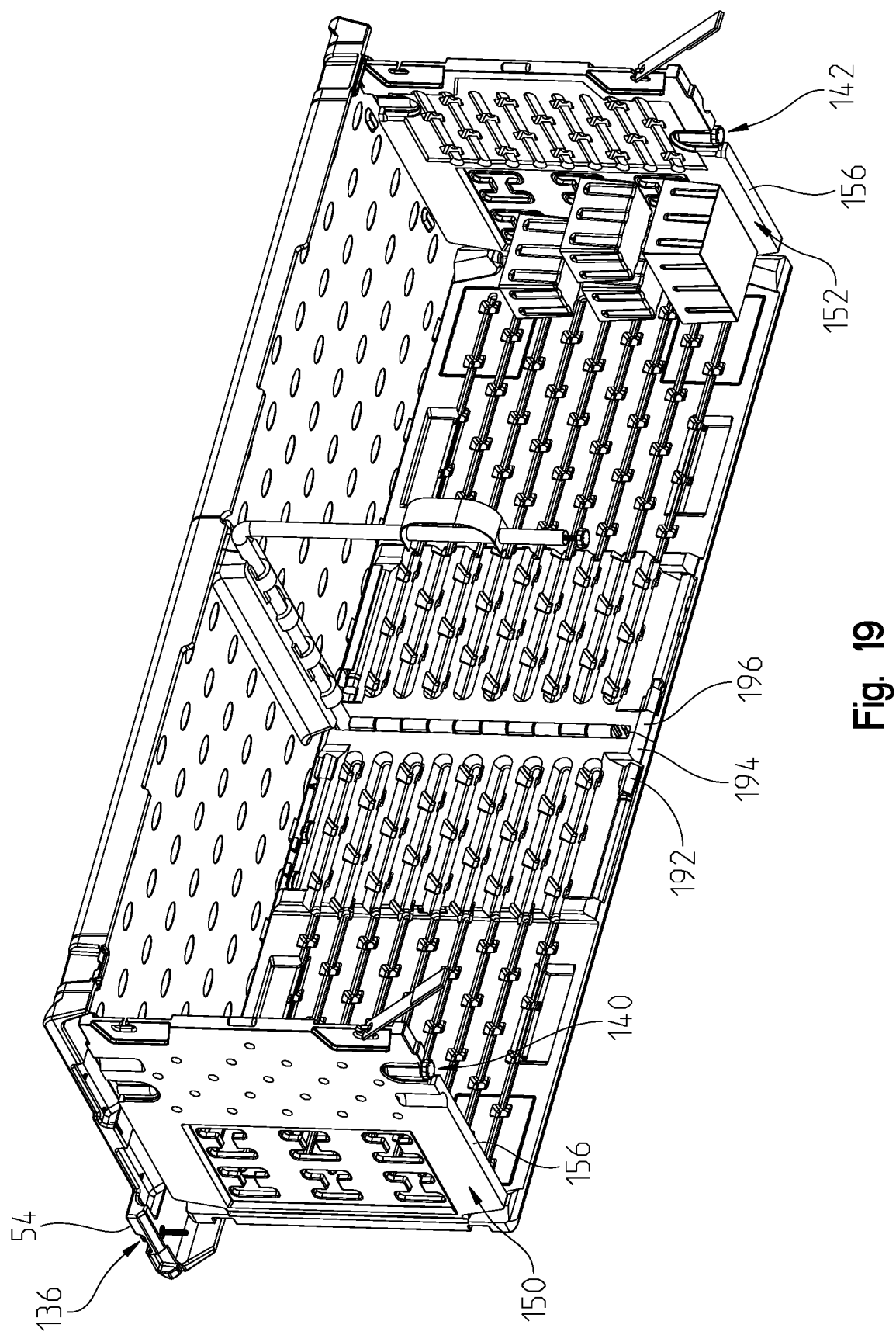
FIG. 19 is a bottom isometric view of the trunk with adjustable feet in FIG. 18.
Figure 20:
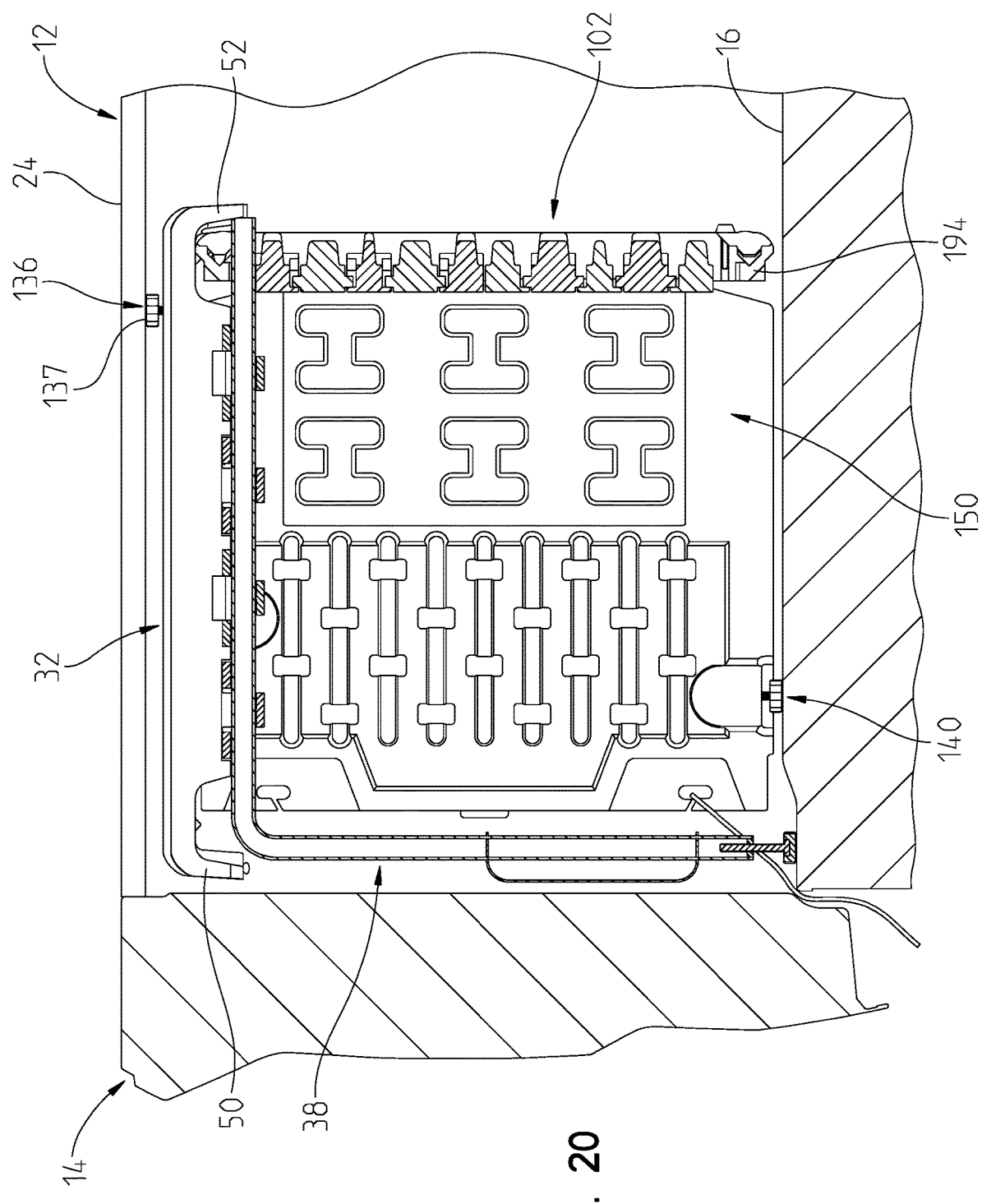
FIG. 20 is a section view 12-12 of the trunk with adjustable feet as installed in a truck bed as shown in FIG. 11.

A wedge portion 74 is located oppositely the arcuate segments 46. A top wall portion 78 has a bottom surface 77 and top surface 76 with the wedge portion 74 extending beyond the top surface 76. Storage locking receivers 80, 82 receive storage locking tabs 60, 62 when the top 30 is in the folded position. The locking tabs 60, 62 and receivers 80, 82 form a snap fit to retain the top 30 in the folded position. The front overhanging portions 50, 70 each have a corresponding notch 64, 84 that form a handle aperture 66 in the folded position. In the unfolded position, the top surfaces 56, 76 are coplanar. The left side wedge portion 54 has a bedrail surface 86 and the right side wedge portion 74 has a corresponding bedrail surface 88, shown in FIG. 4. As shown, the bedrail surfaces 86, 88 protrude above their respective sides 32, 34, but it is contemplated that the bedrail surfaces 86, 88 are in the same plane as the top surfaces 56, 76 or located below them, depending on the individual configuration of the truck bed 12. The bedrail surfaces 86, 88 are spaced from bottom surfaces 57, 77. The distance 134 of the bedrail surface 88 to bottom surface 57 is shown in FIG. 13 and the distance of the bedrail surface 86 to the bottom surface 77 is identical. As shown in FIGS. 18-20, optional adjusters 136, 138 are attached to the wedge portions 54, 74. The adjusters 136, 138 are threaded and can adjust to be proud of their respective bedrail surfaces 86, 88. The adjusters have a top surface 137, 139 which increases the distance 134 when adjusted beyond their corresponding bedrail surface 86, 88.

The trunk includes upstanding sidewalls. A rear sidewall 100 has a left side 102 and a right side 104 that are connected through a hinge 106. The hinge 106 is formed by interlocking features on the left and right sides 102, 104 that allow them to pivot about a rear axis 108 between a folded position and an unfolded position. As shown, the left side 102 is identical to the right side 104 with the interlocking features complimentarily mating to form the hinge 106. The left side 102 is mirror symmetrical about a plane 103, except for the hinge features, which are complimentary about the plane 103, shown in FIG. 8. The embodiment shown herein describes the left and right sides 102, 104 as identical but it is contemplated that they are different. The left side 102 will be used to describe features and components. The left side 102 has a top lateral edge 110 and a bottom lateral edge 112 that are spaced apart by a distance to define a height 114. An inner hinge side 116 is located opposite an outer hinge side 118. The interlocking features that form the hinge 106 are either pins 120 or pockets 122 with the pins 120 located on one portion 124 and the pockets 122 located on the other portion 126. The pockets 122 of the left side 102 are designed to receive the pins 120 of the right side 104, with the pins 120 of the left side 102 being received by the pockets 122 of the right side 104. The outer hinge side 118 has pin pockets 130, 132 that are located near corresponding top and bottom lateral edges 110, 112.

Figure 17:
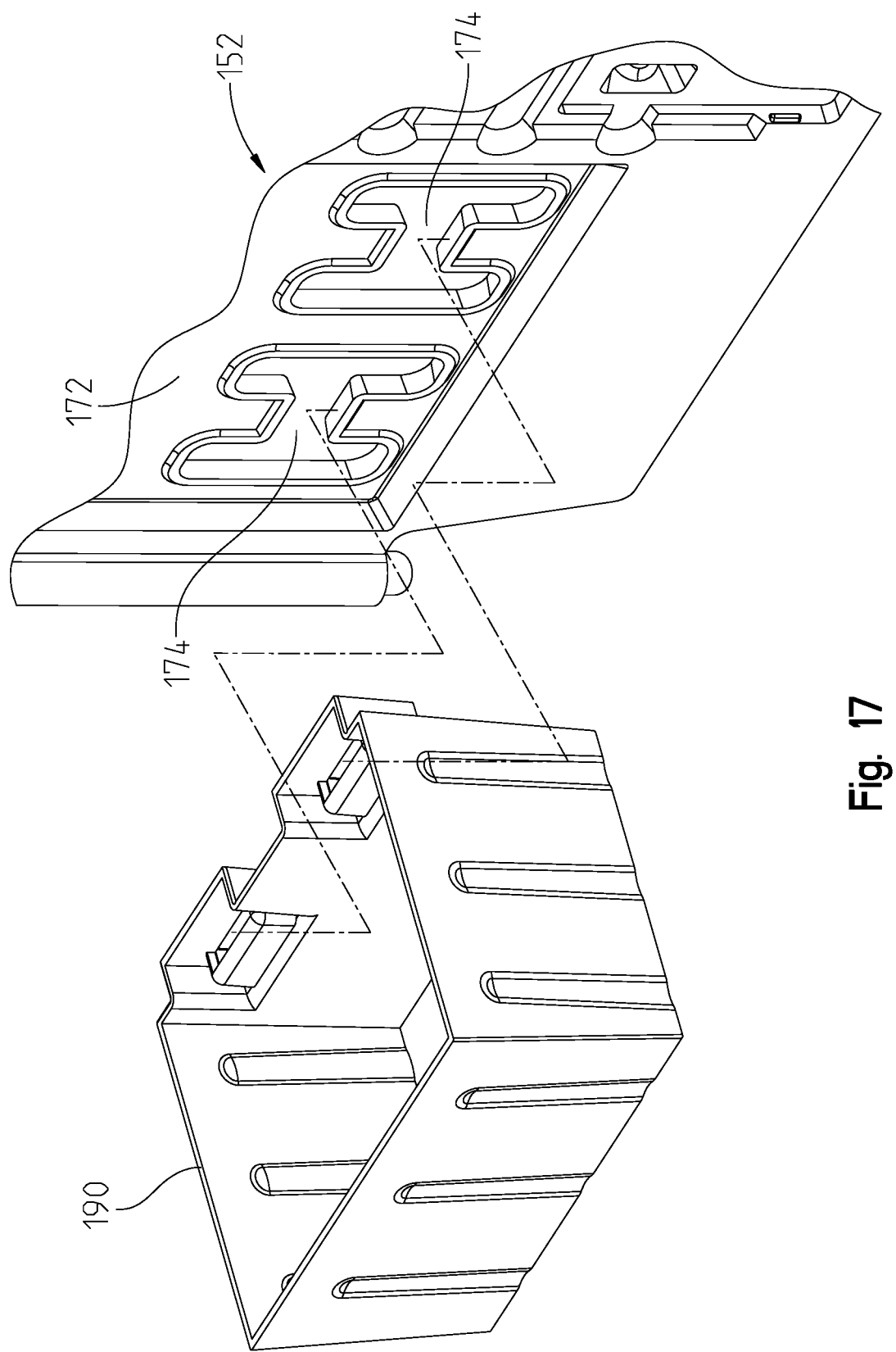
FIG. 17 is a partial isometric view of the storage bins as shown in FIG. 9.

A left sidewall 150 is shown as identical to a right sidewall 152 and is symmetrical about a plane 176. The left sidewall 150 is connected to the outer hinge side 118 of the left side 102 and the right sidewall 152 is connected to the outer hinge side 118 of the right side 104. The left sidewall 150 has a top lateral edge 154 and a bottom lateral edge 156 spaced therefrom to define a height 162. A tailgate edge 158 is located oppositely a side hinge portion 160. The side hinge portion 160 has pins 164, 166 that mate with pin pockets 130, 132. When the left sidewall 150 is mated to the left side 102, a side hinge axis 168 is formed to allow the left sidewall 150 to pivot with respect to the left side 102. Correspondingly, when the right sidewall 152 is mated to the right side 104, a side hinge axis 170 is formed to allow the right sidewall 152 to pivot with respect to the right side 104. The left sidewall 150 has an accessory area 172 that has a series of accessory receivers 174. The accessory receivers 174 are "H" shaped and designed to receive and retain accessories, such as storage bins 190 as shown in FIG. 17. The storage bins 190 are shown as bins with an open top, but other styles are contemplated, including but not limited to bins with snap-fit lids, enclosures, hooks, or hangers. The left sidewall 150 includes retainer receivers 178 that can receive a retainer strap 182. The retainer strap is made from resilient material and hooks to the receiver 178 that is nearest the bottom lateral edge 156. Optionally, the sidewalls 150, 152 as shown in FIGS. 18-19 include adjustable bed feet 140, 142. The adjustable bed feet 140, 142 are threaded and can adjust to extend beyond the bottom lateral edge 156. The adjustable bed feet 140, 142 have corresponding bottom surfaces that increase the height 162 when adjusted beyond the bottom lateral edge 156. The adjustable bed feet 140, 142 are used to accommodate different elevations of the bed floor 16, such as the corrugations visible in FIG. 10.

As shown in FIG. 15, the sidewalls 150, 152, 102, 104 remain connected to each other, even when folded flat. The left and right sidewalls 150, 152 fold inwardly and are held between the left side 102 and right side 104 of the rear sidewall 100. The sidewalls are held within the left side 32 and right side 34 of the top 30.

Figure 5:
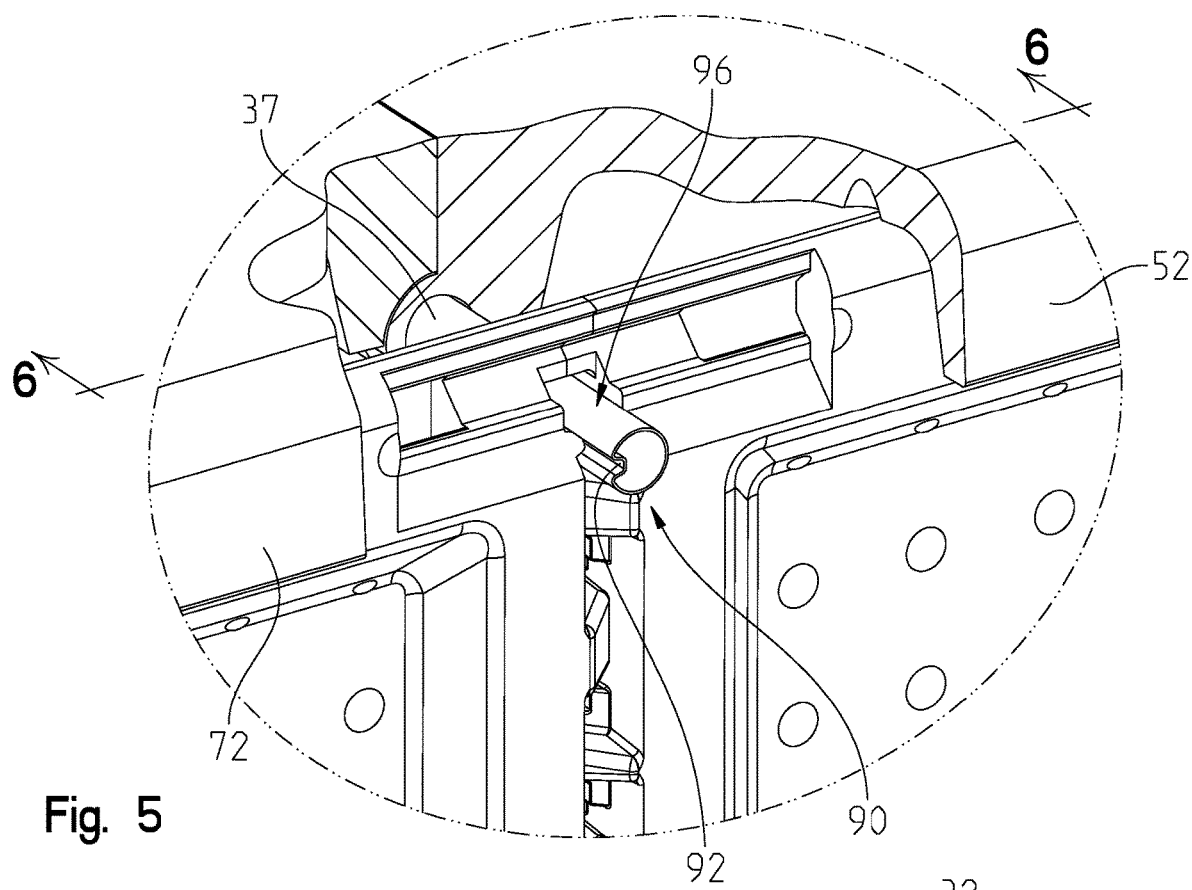
FIG. 5 is partial section view 5 of the trunk in FIG. 4.
Figure 6:
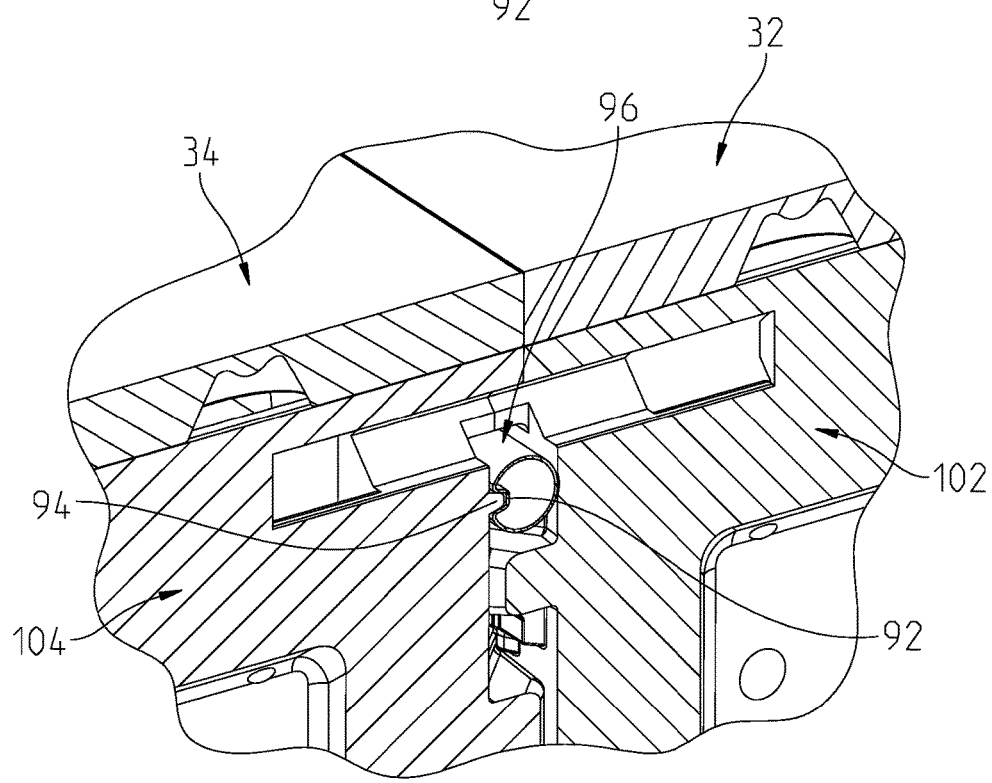
FIG. 6 is a section view 6-6 of the trunk in FIG. 5.
Figure 7:
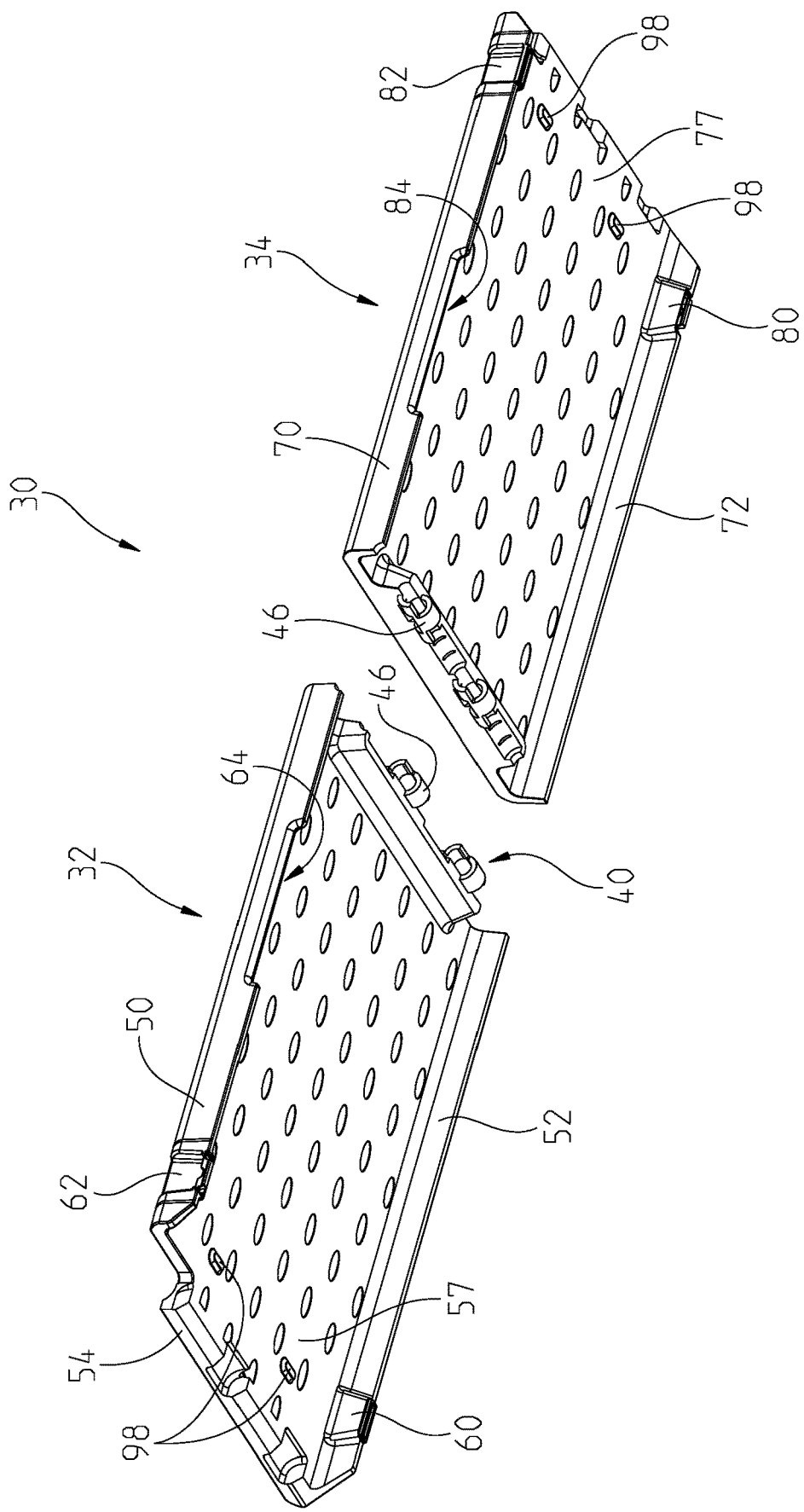
FIG. 7 is an exploded view of the top.
Figure 8:
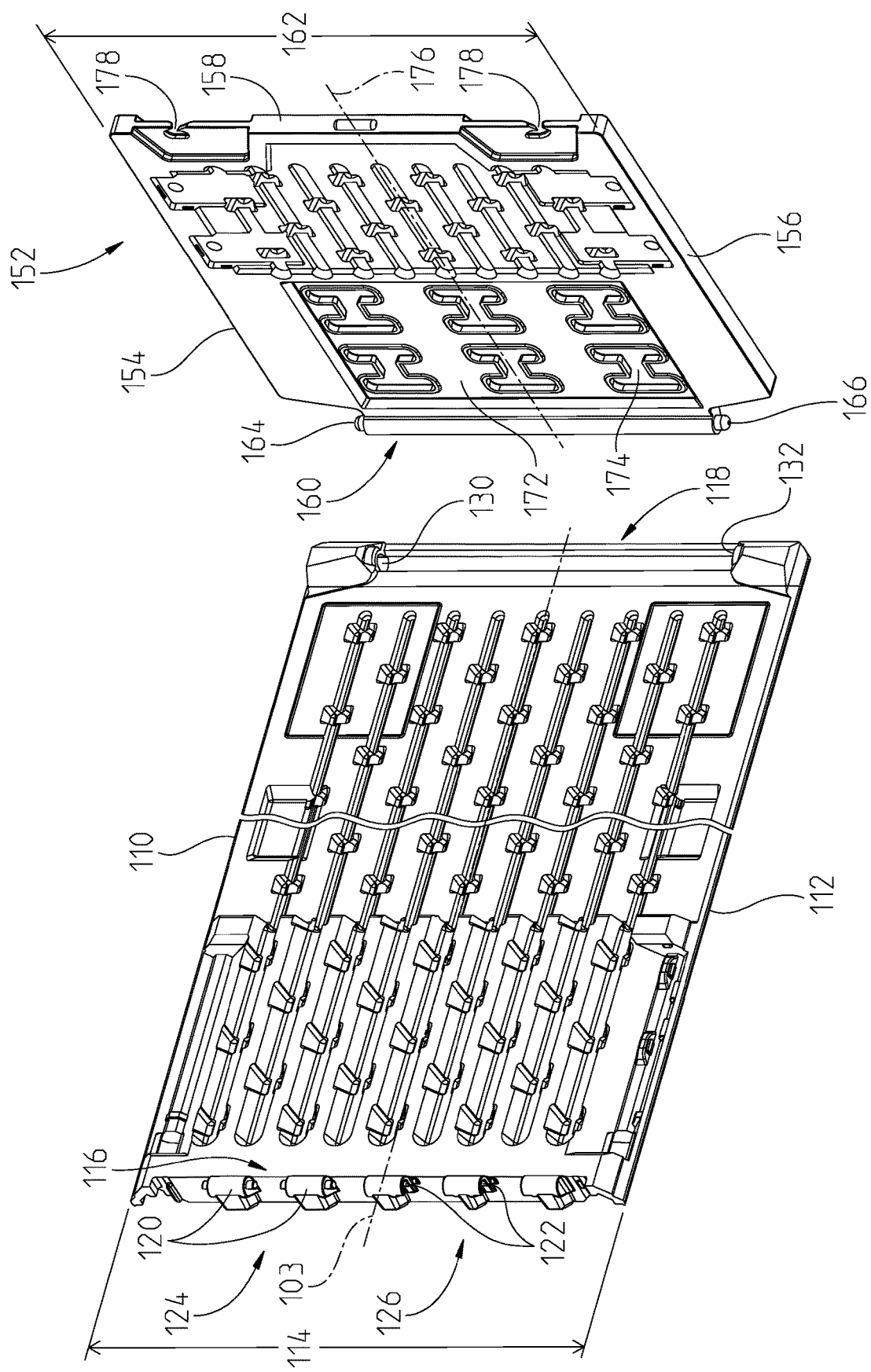
FIG. 8 is an exploded view of one rear sidewall and one sidewall.
Figure 9:
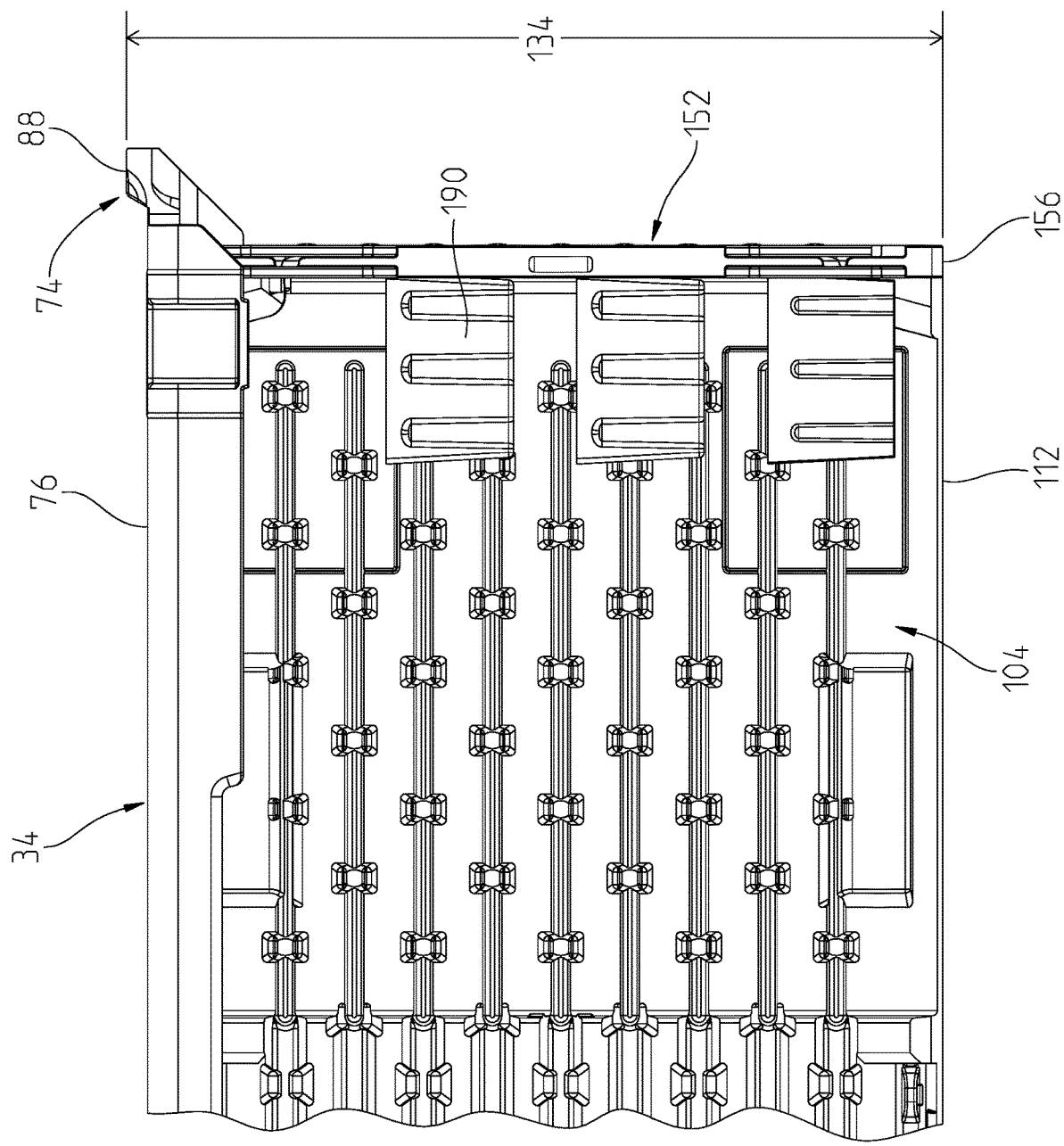
FIG. 9 is a partial view of the trunk with the top installed.

The locking leg 38 has a locking feature 90, shown in FIGS. 5 and 6, that locks the top 30 to the rear sidewall 100. The locking feature 90 has a slot 92 that slides to mate with a tab 94 on the right side 104. In the unfolded position, the rear sidewall 100 has a locking aperture 96 formed by the left side 102 and right side 104 at one end of the hinge 106. The locking leg 38 slides into the aperture 96 to mate with the tab 94 along the hinge axis 44. When mated, the top 30 is held to the rear sidewall 100. The rear sidewall cannot move outwardly because it is captured between the hinge 36 and overhanging walls 52 and 72.

As installed on the truck bed 12, the top 30 fits over sidewalls to pin them in place. The top 30 includes cleats 98 that protrude downwardly from the top wall portions 58, 78 to prevent the left and right sidewalls 150, 152 from moving out of position. The cleats 98 extend outwardly beyond the bottom surfaces 57, 77 of the top wall portions 58, 78.

The trunk 10 is secured and requires no modification to the truck bed 12. There are no brackets to attach to the bed 12, no holes to drill, and the trunk 10 is installed without the use of any hand tools. Removing the trunk 10 leaves no components attached to the bed 12. The trunk 10 is retained to the bed 12 only by the pressure or biased force created by the cooperation of the sidewalls 100, 150, 152 and the top 30. The securing of the top 30 cantilevers the wedge portions 54, 74 in a single motion to generate the biased force. The biased force presses upwardly on the bed rails 22, 24 and downwardly on the floor 16. Without the biased force, the trunk 10 would be insufficiently constrained and allow movement with respect to the bed. The retainer straps 182 prevent movement of the trunk 10 away from the tailgate 14, particularly when any cargo located inside the trunk shifts during braking.

An optional lower lock 192 slides between a locked position and an unlocked position. The unlocked position allows the rear sidewalls 102, 104 to pivot about the rear axis 108 and the locked position prevents the sidewalls from pivoting. The lower lock 192 slides through lock apertures 194, 196 to span across both sidewalls 102, 104 and provides additional security. It provides support for heavier cargo that may slide around and shift while driving. In the unlocked position, the lower lock 192 resides in one of the rear sidewalls 102, 104 to lock the hinge 106.

Figure 10:
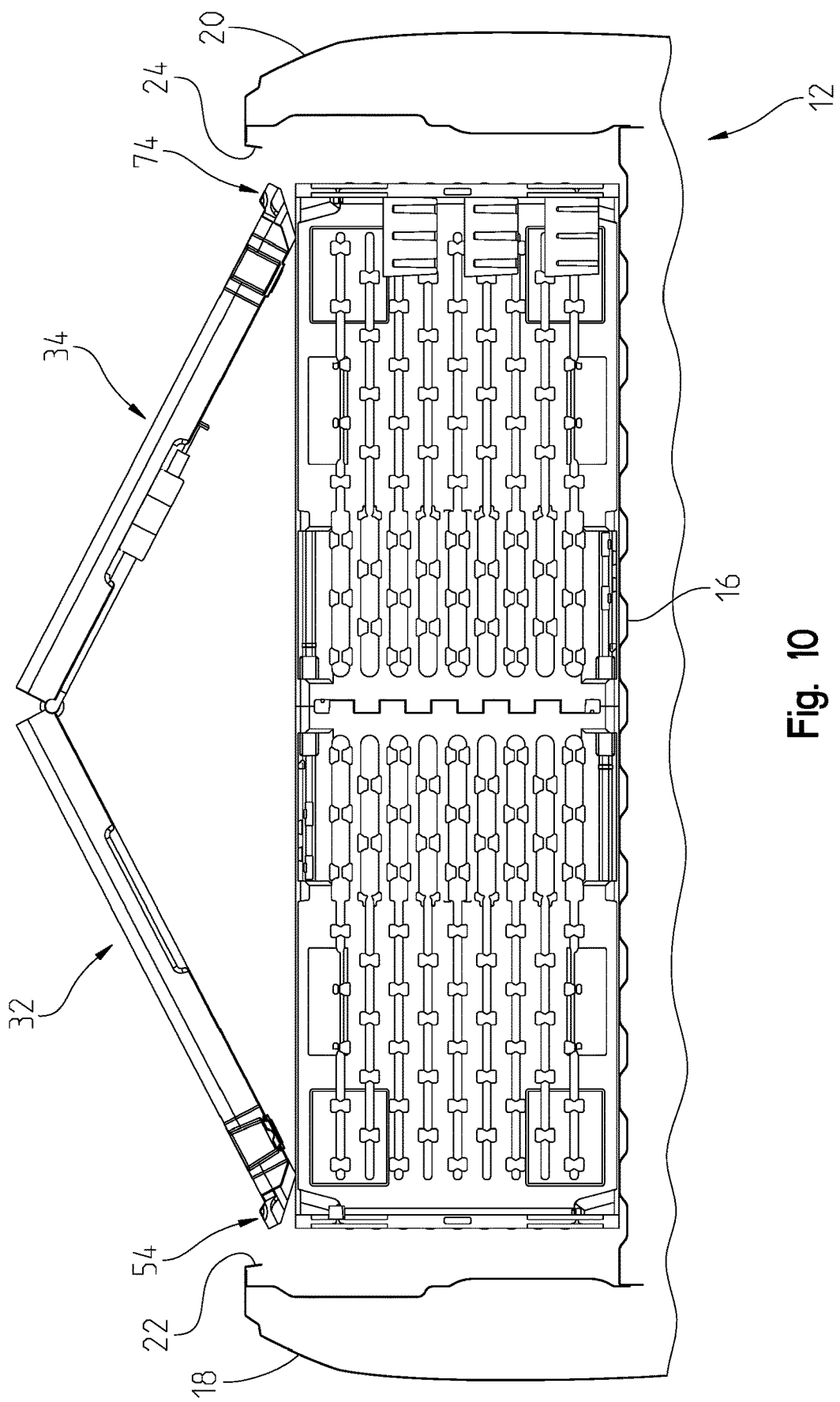
FIG. 10 is a front view of the trunk with the sidewalls in the use position and the top moving from the folded position to the use position.

To install the trunk 10, the user first unfolds the top 30 to gain access to the rear sidewall 100 and left and right sidewalls 150, 152. The user places the rear sidewall 100 to locate the left sidewall 150 and right sidewall 152 with the tailgate edges 158 facing the tailgate and near the end of the bed 12. The retainer straps 182 are located between the end of the floor 16 and tailgate 14. Next, the user partially folds the top 30 to place the wedge portion 54 between the top lateral edge 154 of the left sidewall 150 and bed rail 22. This is shown in FIG. 10. The user also places the wedge portion 74 between the top lateral edge 154 of the right sidewall and bed rail 24. The user then presses down on the top 30 in the area of the hinge 36 to fully unfold the top 30. The overhanging portions 52, 72 capture the rear sidewalls 102, 104, shown in FIG. 4. As assembled, the distance 134 from the bottom lateral edges 110, 112, 156 and the bedrail surfaces 86, 88 is equal to or greater than the distance between the floor 16 and the area of the bedrails 22, 24, shown in FIG. 9. In the event the user uses the optional adjusters 136, 138, the distance 134 is increased to be greater or equal to the distance between the floor 16 and the area of the bedrails 22. This creates a biasing force that holds the trunk 10 from moving around or rattling. Once the top 30 is fully unfolded, the locking aperture 96 is lined up with the locking leg 38. The user then pivots the locking leg downward so the adjustable foot 48 contacts the floor 16. The user then slides the locking leg 38 into the locking aperture 96, mating the slot 92 with the tab 94, shown in FIGS. 5 and 6. Alternatively, the locking leg 38 can be slid into the locking aperture 96 and then pivoted down to contact the adjustable foot 48 to the floor 16. To prevent unauthorized access, the overhanging portions 52, 72 cover the terminal end of the hinge portion 37. If the optional lower lock 192 is used, the user would then slide the lock 192 through both apertures 194, 196 to lock the hinge 106.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A collapsible storage device for use with a truck having a bed with a floor and sides that extend upwardly therefrom, said sides each having bedrails spaced from said floor at a first distance, said bed having a tailgate moveable between a closed position and an open position, said storage device comprising:
    a top having a left side pivotably attached to a right side at a top hinge and foldable between an unfolded position and a folded position, said left side having a left bedrail surface, said right side having a right bedrail surface, said top having an overhanging portion, said folded position defined by said left side overlaying said right side, said unfolded position defined by said left side in line with said right side;
    a locking leg movable between an unlocked position and a locked position, said locking leg having a hinge pin portion extending into a support portion, said hinge pin portion extending through hinge apertures in said left side and said right side to form said top hinge;
    a rear sidewall having a left side and a right side, said left side hingeably attachable to said right side and pivotable between a folded position and an unfolded position, said folded position defined by said left side overlaying said right side, said unfolded position defined by said left side in line with said right side, a locking aperture formed in said rear sidewall when said rear sidewall is in said unfolded position, said locking aperture receiving a terminal end of said locking leg in said locked position;
    a left sidewall hingeably attachable to said left side of said rear sidewall and pivotable between a folded position and an unfolded position, said left sidewall having a left bottom lateral edge;
    a right sidewall hingeably attachable to said right side of said rear sidewall and pivotable between a folded position and an unfolded position, said right sidewall having a right bottom lateral edge; and
    when said rear sidewall, said left sidewall, and said right sidewall are in said unfolded position and said top is overlaying said sidewalls, said storage device having a second distance from one of said bottom lateral edges to a corresponding said bedrail surface, said second distance being greater than said first distance.

2. The storage device in claim 1, wherein said top forms a storage cavity between said left side and said right side in said folded position, said storage cavity receiving said left sidewall, said rear sidewall, and said right sidewall.

3. The storage device in claim 1, wherein said left bedrail surface is located on a wedge portion of said left side, said right bedrail surface is located on a wedge portion of said right side, said wedge portions located at terminal ends of said left and right sides.

4. The storage device in claim 1, wherein said locking leg is pivotable about a hinge axis and slidable along said hinge axis, said locking leg including a foot for contacting said floor of said bed in said locked position.

5. The storage device in claim 1, wherein said second distance generates an upward biasing force on said bedrails and a downward biasing force on said floor to retain said storage device in said bed.

6. The storage device in claim 1, further comprising a first adjuster threadably received by said left side and extendable beyond said left bedrail surface and a second adjuster threadably received by said right side and extendable beyond said right bedrail surface.

7. The storage device in claim 1, further comprising an adjustable bed foot threadably received in one of said sidewalls and extendable beyond a corresponding said bottom lateral edge.

8. The storage device in claim 1, wherein said left side and said right side of said rear sidewall are identical, said left sidewall and said right sidewall are identical.

9. The storage device in claim 8, wherein said left side of said rear sidewall is hingeably attachable to said right side of said rear side wall through a snap together hinge formed by pins and pockets complimentary about a symmetrical plane on said left side and said right side.

10. A collapsible storage device for use with a truck bed having bedrails spaced from a floor, said truck bed having a tailgate, said storage device comprising:
    a top wall having a left side and a right side hingeably connected thereto, said top wall having a bedrail surface;
    a locking leg extending through said left side and said right side and movable between an unlocked position and a locked position;

sidewalls comprising a rear sidewall, a left sidewall, and a right sidewall, said left sidewall hingeably connected to a left side of said rear sidewall, said right side hingeably connected to a right side of said rear sidewall, said sidewalls having a bottom lateral edge for contacting said floor; and when said top wall overlays said sidewalls, said storage device is secured to said truck bed with only biased force from said bedrail surface and said bottom lateral edge, said biased force extending between said bedrails and said floor.

11. The storage device in claim 10, said top wall is pivotable between a folded and unfolded position, in said folded position, said left side overlays said right side, said sidewalls pivotable between a folded and unfolded position, said folded position defined by said left side of said rear sidewall overlaying said left sidewall, said right sidewall, and said right side of said rear sidewall.

12. The storage device in claim 10, further comprising a lower lock in said rear sidewall, said lower lock adjacent said bottom lateral edges and slidable between a locked position and an unlocked position, said locked position defined by said lower lock extending through lock apertures in said left side and said right side of said rear sidewall.

13. The storage device in claim 10, wherein said left side of said rear sidewall is hingedly connected to said right side of said rear sidewall through a snap-fit hinge comprising pins and pockets on each of said sides, said pins on one of said sides complimentary to said pockets on the other of said sides.

14. The storage device in claim 10, said left sidewall and said right sidewall having resilient straps extending therefrom, said resilient straps for being captured between said bed floor and said tailgate when said storage device is installed in said truck bed and said tailgate is closed.

15. A collapsible storage device for use with a truck bed having bedrails spaced from a floor and a tailgate, said storage device comprising:
said storage device being held in biased contact between said bedrails and said floor when installed in said truck bed;
a folding top having a hinge located between opposing bedrail surfaces, each said bedrail surface having a corresponding bottom surface spaced from said bedrail surfaces;
a folding sidewall having a bottom lateral edge for contacting said floor and an upper lateral edge for contacting said folding top, said sidewall having a locking aperture;
said folding top and said sidewall cooperate to wedge said bedrail surfaces underneath said bedrails to retain said storage device between said bedrails and said floor; and
said folding top is retained to said sidewall when a portion of said hinge extends through said locking aperture.

16. The storage device in claim 15, said storage device and said truck bed forming an enclosed volume when installed in said truck bed and said tailgate is closed.

17. The storage device in claim 15, wherein said sidewall is formed from a rear sidewall, a left sidewall, and a right sidewall, said left and right sidewalls hingedly connected to said rear sidewall.

18. The storage device in claim 17, wherein said sidewall is foldable to be stored and retained between sides of said folding top.

19. The storage device in claim 15, further comprising adjusters threadably received by said folding top and extendable beyond corresponding said bedrail surfaces.

20. The storage device in claim 15, further comprising an adjustable bed foot threadably received in said folding sidewall and extendable beyond a corresponding said bottom lateral edge.

* * * * *